United States Patent
Hoes et al.

(10) Patent No.: US 9,896,972 B2
(45) Date of Patent: Feb. 20, 2018

(54) FACETED HOUSING FOR AXIAL TURBOMACHINE COMPRESSOR

(71) Applicant: Techspace Aero S.A., Herstal (Milmort) (BE)

(72) Inventors: Kris Hoes, Bierbeek (BE); Angela Durie, Knokke-Heist (BE); Alain Derclaye, Couthuin (BE)

(73) Assignee: Safran Aero Boosters SA (BE)

( * ) Notice: Subject to any disclaimer, the term of this patent is extended or adjusted under 35 U.S.C. 154(b) by 293 days.

(21) Appl. No.: 14/683,299

(22) Filed: Apr. 10, 2015

(65) Prior Publication Data

US 2015/0292363 A1 Oct. 15, 2015

(30) Foreign Application Priority Data

Apr. 11, 2014 (EP) .................................... 14164502

(51) Int. Cl.
*F01D 25/24* (2006.01)
*F01D 9/04* (2006.01)
*F01D 17/16* (2006.01)

(52) U.S. Cl.
CPC ........... *F01D 25/246* (2013.01); *F01D 9/042* (2013.01); *F01D 17/162* (2013.01); *Y02T 50/672* (2013.01)

(58) Field of Classification Search
CPC .......... F01D 17/162; F01D 1/04; F01D 25/24; F01D 25/243; F01D 25/246; F01D 25/265; F01D 9/042; Y02T 50/672; F05D 2300/6034
See application file for complete search history.

(56) References Cited

U.S. PATENT DOCUMENTS

| | | | | |
|---|---|---|---|---|
| 2,755,064 A | * | 7/1956 | Simonsen | F01D 9/042 415/209.3 |
| 5,630,702 A | * | 5/1997 | Marmilic | F01D 11/18 415/173.1 |
| 5,639,212 A | * | 6/1997 | Schaefer | F01D 11/001 415/173.1 |

(Continued)

FOREIGN PATENT DOCUMENTS

| | | |
|---|---|---|
| EP | 1959094 A2 | 8/2008 |
| EP | 2402615 A1 | 1/2012 |
| WO | 2005047656 A1 | 5/2005 |

OTHER PUBLICATIONS

European Search Report from corresponding European Application No. EP 14164502, dated Oct. 7, 2014.

*Primary Examiner* — Woody Lee, Jr.
*Assistant Examiner* — Elton Wong
(74) *Attorney, Agent, or Firm* — Polster Lieder

(57) ABSTRACT

The invention relates to an external composite housing for a compressor of an axial turbomachine, the housing having a generally circular wall with a matrix and fiber reinforcement. The housing includes a circular wall with an internal surface having a continuous curve around the circumference of the wall. The wall includes flat facets that are flush with the internal curved surface of the wall. The facets are arranged in annular rows to receive annular rows of stator vanes. The facets are flat disks against which the vanes bear to optimize the orientation of the vanes, while reducing the concentrations of mechanical stresses at the platform/wall interfaces.

20 Claims, 3 Drawing Sheets

(56) References Cited

U.S. PATENT DOCUMENTS

| | | | |
|---|---|---|---|
| 6,543,995 B1* | 4/2003 | Honda | F01D 9/041 |
| | | | 415/189 |
| 2010/0158685 A1* | 6/2010 | Lebrun | F01D 9/042 |
| | | | 415/209.3 |
| 2011/0110783 A1* | 5/2011 | Addis | B23P 6/005 |
| | | | 416/219 R |
| 2014/0033734 A1* | 2/2014 | Lockhart | F04D 29/542 |
| | | | 60/796 |

* cited by examiner

FACETED HOUSING FOR AXIAL TURBOMACHINE COMPRESSOR

CROSS-REFERENCE TO RELATED APPLICATIONS

This application claims the benefit, under 35 U.S.C. § 119, of EP 14164502.8, filed Apr. 11, 2014, the disclosure of which is incorporated herein by reference in its entirety.

FIELD

The invention relates to an external housing of an axial turbomachine. More specifically, the invention relates to a turbomachine housing including a circular wall with a continuous curve. The invention also relates to a turbomachine with a housing.

BACKGROUND

The statements in this section merely provide background information related to the present disclosure and can not constitute prior art.

An axial turbomachine compressor usually has an external housing to which rows of vanes are attached. They can be attached in grooves, or using fitting bolts passing through the wall of the housing. This solution is particularly advantageous if the wall is essentially thin, measuring a few millimeters. Each vane then has an attachment platform with one surface in contact with the internal surface of the wall of the housing.

For reasons of mechanical strength, the vanes and the platforms can be made of metal, for example steel or titanium alloy. The wall is made of a composite material in order to lighten the housing. For optimum mass saving, the composite can include a polymer resin combined with reinforcement incorporating carbon fibers.

Document EP 2 402 615 A1 discloses an axial compressor with an external housing made of a composite material. The wall of same has three annular rows of vanes that are pressed flat at the platforms of same. The mechanical connection is provided by attachment elements. This teaching tends to optimize the rigidity and lightening of the stator. However, during assembly, stresses are concentrated at the interface between the wall and the platforms, potentially resulting in damage caused by differences in hardness. It is taught here to add joints for absorbing shocks at the interface between the wall and the platforms in the event of ingestion. However, the elasticity of the joints reduces rigidity, and the addition of same increases mass. This solution complicates assembly.

This teaching optimizes the strength of the composite housing. However, the rigidity of same remains low, and can become insufficient in the case of external compressor housings since such housings are subject to high stresses. In the event of loss of a fan vane, the turbomachine undergoes high-amplitude vibration, and the housing is then highly stressed. Thermal stresses and humidity also significantly reduce the mechanical strength of the housing.

SUMMARY

The invention is intended to address at least one of the problems presented by the prior art. More specifically, the invention is intended to reduce the concentrations of stresses between a wall of the turbomachine housing and the vane platforms. The invention is also intended to simplify a housing wall receiving vanes provided with attachment platforms.

The invention relates to an axial turbomachine housing, in particular of a compressor, the housing having a circular wall with an internal surface having a continuous curve around the circumference of the wall, that is noteworthy in that the wall includes flat facets that are designed to receive stator-vane platforms and that are flush with the internal curved surface of the wall.

According to various advantageous embodiments of the invention, the facets are arranged in at least one annular row, e.g., in various embodiments, in several annular rows distributed axially along the wall and/or the facets from different rows are aligned axially.

According to various advantageous embodiments of the invention, the facets and the internal surface have an axially and/or circumferentially continuous surface at the junctions of same, the facets being inclined in relation to the tangents of the internal curved surface at the junctions of the facets.

According to various advantageous embodiments of the invention, the facets are distributed angularly around the circumference of the internal surface.

According to various advantageous embodiments of the invention, the wall has a constant thickness beside the facets, and/or the external surface of the wall includes external flats beside the facets.

According to various advantageous embodiments of the invention, each facet has at least one attachment orifice suitable for attaching a stator vane, and potentially only one orifice per facet; the orifices being arranged in at least one annular row.

According to various advantageous embodiments of the invention, the internal surface extends upstream and downstream from each facet, and/or the internal surface extends around the circumference of the wall between the facets.

According to various advantageous embodiments of the invention, each or at least one facet is disk shaped, and some disks can be truncated laterally.

According to various advantageous embodiments of the invention, the facets of at least one row are contiguous individually or along joining lines.

According to various advantageous embodiments of the invention, the internal surface includes a cone portion, and/or a spherical-surface portion, and/or a spheroid-surface portion.

According to various advantageous embodiments of the invention, the wall is a composite wall with an organic matrix and a fiber reinforcement comprising a stack of fiber plies, the fiber plies being parallel to the facets beside the facets, and curved beyond the facets.

According to various advantageous embodiments of the invention, the housing includes at least one annular row of stator vanes, each stator vane having an attachment platform with a flat bearing surface pressed against a facet, the platforms of the vanes in a given row being in lateral contact with each other; each vane also having a blade extending radially inwards from the platform.

According to various advantageous embodiments of the invention, each vane platform includes at least one thinner zone and one thicker zone, each platform bearing surface being formed on a thicker zone and being inscribed within a corresponding facet, in various embodiments each bearing surface being circular.

According to various advantageous embodiments of the invention, each vane attachment platform has a fitting bolt passing through a related facet.

According to various advantageous embodiments of the invention, the internal surface is continuous and/or smooth in the circumferential direction of the wall.

According to various advantageous embodiments of the invention, the internal surface prolongs the facets axially and/or circumferentially, in various embodiments directly.

According to various advantageous embodiments of the invention, the limits of the facets are the lines formed in the internal surface.

According to various advantageous embodiments of the invention, the facets are separated from one another by the internal surface.

According to various advantageous embodiments of the invention, the facets are prolonged by the internal surface, e.g., directly.

According to various advantageous embodiments of the invention, the facets and the internal surface of the wall form a continuous surface.

According to various advantageous embodiments of the invention, the disks of at least one annular row of facets are truncated towards the other facets of the row.

The invention also relates to an axial turbomachine compressor having a housing, that is noteworthy in that the housing is as claimed in the invention.

The invention also relates to an axial turbomachine having a housing, that is noteworthy in that the housing is as claimed in the invention, and in that the turbomachine includes a compressor, the housing being the housing of the compressor and being formed by two annular half-housings each having axial flanges for assembling the half-housings.

According to various advantageous embodiments of the invention, the turbomachine includes a compressor as claimed in the invention.

The invention makes it possible to reduce the concentrations of stresses between a housing wall and the vane platforms. This advantage is achieved by the flat shape of the facets, which are compatible with the flat surfaces of the platforms. These surfaces are cheap to produce because the platforms can simply be machined by milling.

Moreover, this attachment method improves the precision of orientation of the vanes since they bear against the flat surfaces, which are precisely formed. The precision of the orientation of a vane is not dependent on the position of the vane in relation to the facet of same, potentially as long as the bearing surface of the platform of the vane remains inscribed within the facet, and/or as long as the fitting bolt remains engaged in the corresponding attachment orifice.

The contact between the flat surfaces facilitates adjustment of the orientation of the chord of the vanes, or vane angle, since the stress concentrations, and therefore the abrasion, is reduced if the vane pivots on the facet of same.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
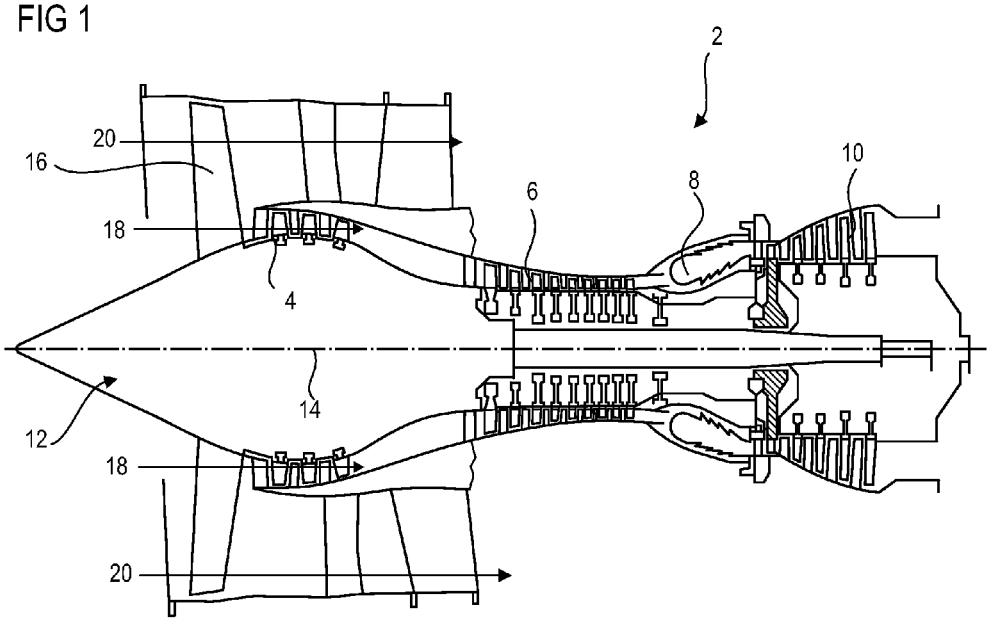
FIG. 1 shows an axial turbomachine according to various embodiments of the invention.

The following description is merely exemplary in nature and is in no way intended to limit the present teachings, application, or uses. Throughout this specification, like reference numerals will be used to refer to like elements.

In the description below, the terms internal and external refer to a position in relation to the axis of rotation of an axial turbomachine. The axial direction runs along the axis of rotation and the radial direction is perpendicular to the axial direction. The lateral direction runs around the circumference, and can be perpendicular to the axis.

FIG. 1 is a simplified representation of an axial turbomachine. In this specific case, it is a dual-flow turbojet. The turbojet 2 has a first compression level, referred to as the low-pressure compressor 4, a second compression level, referred to as the high-pressure compressor 6, a combustion chamber 8, and one or more turbine levels 10. When in operation, the mechanical power of the turbine 10 transmitted via the central shaft to the rotor 12 moves the two compressors 4 and 6.

The compressors have several rows of rotor vanes associated with rows of stator vanes. The rotation of the rotor about the axis of rotation 14 thereof thereby enables an air flow to be generated and progressively compressed until it enters the combustion chamber 8.

An inlet fan 16 is coupled to the rotor 12 and generates an airflow that is divided into a primary flow 18 passing through the different levels mentioned above of the turbomachine, and a secondary flow 20 that passes through an annular duct (partially shown) along the machine before rejoining the primary flow at the outlet of the turbine. The primary and secondary flows 18, 20 are annular flows, they are ducted using cylindrical partitions, or shrouds, which can be internal or external.

Figure 2:
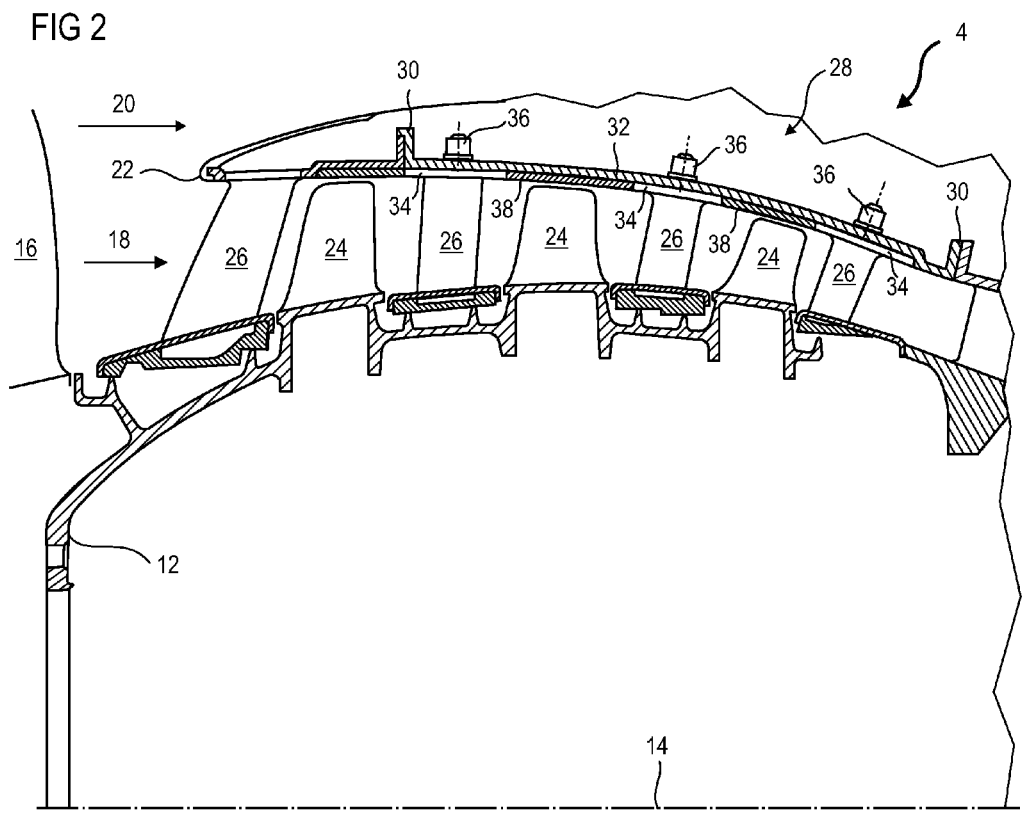
FIG. 2 is a diagram of a turbomachine compressor according to various embodiments of the invention.

FIG. 2 is a cross-section of a compressor of an axial turbomachine, such as the one in FIG. 1. The compressor can be a low-pressure compressor 4. A part of the fan 16 and the separator tip 22 of the primary flow 18 and of the secondary flow 20 are shown. The rotor 12 can include several rows of rotor vanes 24, in this case three.

The low-pressure compressor 4 can include at least one guide vane, e.g., several guide vanes, in this case four, that each contain an annular row of stator vanes 26. Each guide vane is related to the fan 16 or to a row of rotor vanes 24 to guide the airflow from same, such as to convert the speed of the flow into pressure.

The compressor has at least one housing 28. The housing 28 can have an overall circular or tubular shape. The housing 28 can be an external compressor housing and can be made of composite materials, which helps to reduce the mass of the housing while optimizing the rigidity of housing. The housing 28 can include attachment flanges 30, for example annular attachment flanges 30, for attaching the separator tip 22 and/or for attachment to an intermediate fan housing of the turbomachine. The housing then acts as a mechanical link between the separator tip 22 and the intermediate fan housing.

The housing is also used to center the separator tip 22 in relation to the intermediate housing, for example using the annular flanges 30 of the housing 28. The annular flanges 30 can be made of composite material and include attachment orifices (not shown) to enable attachment using bolts or lockbolts. The flanges 30 can have centring surfaces, such as centring orifices.

The housing 28 can have a generally circular or semi-circular wall 32, the axial edges of which can be delimited by flanges 30. The wall 32 can have a profile of revolution about the axis of rotation 14. The wall 32 can be made of composite material, with a matrix and reinforcement. The wall 32 can be ogive-shaped, with a varying radius along the axis 14.

The stator vanes 26 extend essentially radially from the wall 32, at the annular vane seating zones. These zones can include attachment means such as annular grooves or attachment orifices. The vanes 26 can be attached there individually, or form vane segments attached to the wall 32. The wall forms a mechanical link between several vanes in different rows and/or in a single row of vanes.

At least one or each stator vane 26 can include an attachment platform 34, potentially provided with fitting bolts 36 such as threaded rods or any other equivalent means. In operation, the stator vanes 26 are subject to stresses from the flow. These stresses can only be borne by the wall 32, in addition to the actual weight of each vane. This layout means that the wall 32 can be subjected to the application of stresses in circles, the stresses being variable given that the flow varies during operation of the turbomachine. The irregularity of the stresses gives rise to composite and complex modes of deformation. The wall can include annular layers of abradable material 38 between the platforms 34 of the vanes, such as to form a barrier between the primary flow 18 and the wall 32.

The housing 28, or at least the wall 32 of the housing, can be made of a composite material. The composite material can be made using a pre-impregnated fiber reinforcement hardened by autoclave or injection. The injection can involve impregnating a fiber reinforcement with a resin, which can be organic, such as epoxy. Impregnation can involve a resin transfer moulding (RTM) method.

The fiber reinforcement can be a woven preform, potentially woven three-dimensionally, or include a stack or roll of different fiber sheets or fiber plies, which can extend along the wall, and over at least one or several flanges. The plies can include carbon fibers, and/or graphite fibers, and/or glass fibers to prevent galvanic corrosion, and/or Kevlar fibers, and/or carbotitanium fibers. Using the aforementioned materials, a turbomachine housing can have a thickness of 3-5 mm for a diameter exceeding 1 meter.

The housing can be formed of half-shells or half-housings, separated along an axial plane. The half-shells of the housing are joined using axial flanges 48.

Figure 3:
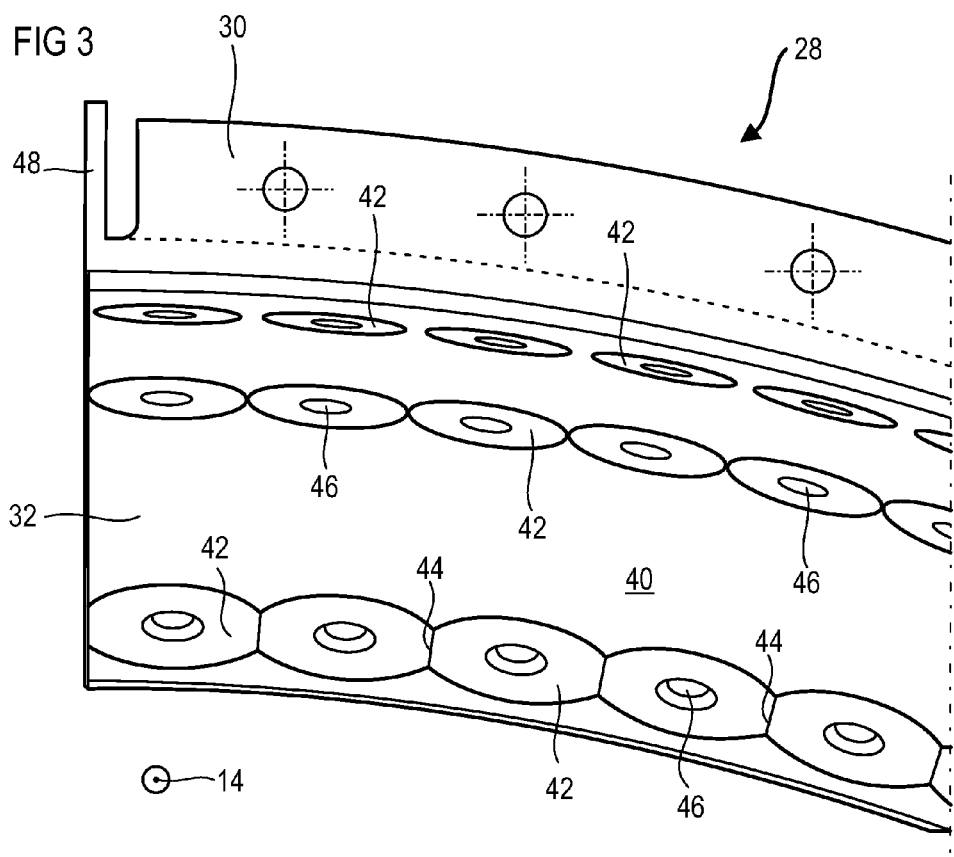
FIG. 3 is an axial view of the housing of the turbomachine compressor according to various embodiments of the invention.

FIG. 3 shows a half-shell of the housing 28 of the axial turbine, for example an external compressor housing, which can be low-pressure. The housing 28 is seen axially from the upstream side. The present teaching can be applied to any turbomachine housing, such as a fan housing or a turbine housing.

The wall 32 has an internal curved surface 40. The internal surface 40 can include a continuous curve around the circumference of the circular wall and/or in the axial direction. The internal surface 40 can be circular about the axis of rotation 14 of the turbomachine, and potentially oriented toward the axis. The wall 32, or at least the internal surface 40, can be annular, and potentially generally tubular. Around the circumference, the curve of the internal surface 40 can be even, and potentially constant. The curve can vary axially, for example it can be more curved towards the downstream side. The internal surface 40 can be a conical surface portion, a spheroid or potentially spherical surface portion, or a combination of each of these surfaces.

The axial length of the wall 32 can be longer than the minimum radius of the internal surface of the wall, and the axial length of same can be equal to or greater than the minimum radius of the internal surface of the wall 32. The axial length is measured along the axis of rotation 14.

The wall 32 includes at least one facet 42, e.g., several facets 42, potentially arranged in an annular row around the circumference of the wall 32. Each facet 42 has a flat surface. The facets 42 of a row can be distributed angularly. The wall 32 can include several annular rows of facets 42, the rows can be distributed along the axial length of the wall 32. At least one or each facet 42 is flush with the internal surface 40 of the wall. Flush means that a facet is level with and/or prolongs and/or is touching the internal surface.

The facets 42 can have different shapes, and the facets of a single row can have the same shape. Each row can have differently shaped facets. The facets 42 can be disk-shaped, oval-shaped. The average diameters of the facets 42 can vary progressively, they can increase towards the extremity of the wall 32 having a minimum diameter.

The facets 42 of a given row can be separated from one another. They can therefore be separated by internal surface portions that have continuous curves. Each facet 42 in a given row can be surrounded by the internal surface 40. The facets 42 in a given row can be tangential to one another, they can be in contact at the contact points. Alternatively, the facets of a given row can be truncated laterally. These facets can be contiguous along joining lines 44, which can form truncations. These contiguous facets can form a continuous annular surface that cuts and/or divides the internal surface 40 of the wall 32 axially. The internal surface 40 can continue upstream and/or downstream of the corresponding row of facets 42.

One or each facet 42 can include attachment means, such as an attachment orifice 46, which can cooperate with a vane fitting bolt. In various embodiments, each attachment orifice 46 is positioned at the center of the related facet. The attachment orifices 46 can be arranged in one or more annular rows. These can be distributed axially along the wall 32.

At least one or each axial flange 48 can be integral with the wall 32, along with at least one or each annular flange 30. Alternatively, at least one type of flange, or each flange can be attached to the wall. For example, the wall can be made of composite material and the flanges can be made of metal and attached to the wall.

Figure 4:
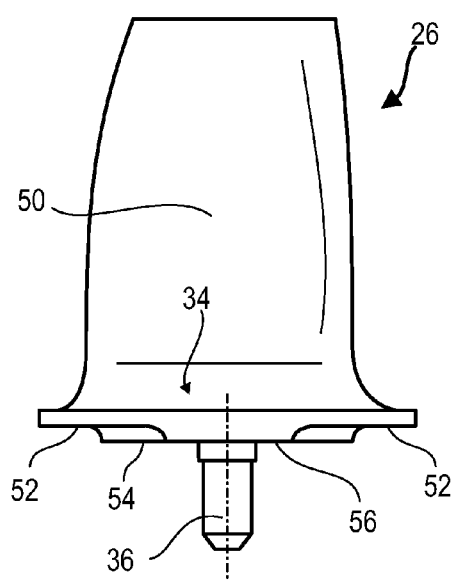
FIG. 4 shows a stator vane with a platform in contact with a facet of the housing according to various embodiments of the invention.

FIG. 4 shows a turbomachine vane, for example a stator vane 26 of a low-pressure compressor guide vane. The vane can also be a turbine vane.

The vane 26 includes a body 50, or blade, forming a shaped surface designed to extend into the primary flow. The shape of body enables the flow to be altered. The head of the vane, at the opposite end to the platform 34, can have devices enabling attachment to an internal shroud.

The platform 34 can have an overall plate shape. The platform can include at least one or two thinner zones 52, and potentially a thicker zone 54. The thicker zone 54 can be surrounded by a thinner zone 52, or be positioned between two thinner zones 52. The fitting bolt 36 can extend in the opposite direction to the blade 50 of the vane. The or each platform 34 includes a bearing surface 56 intended to bear against a facet in order to position and orient the vane, and the bearing surface 56 can be formed on a thicker zone 54.

Figure 5:
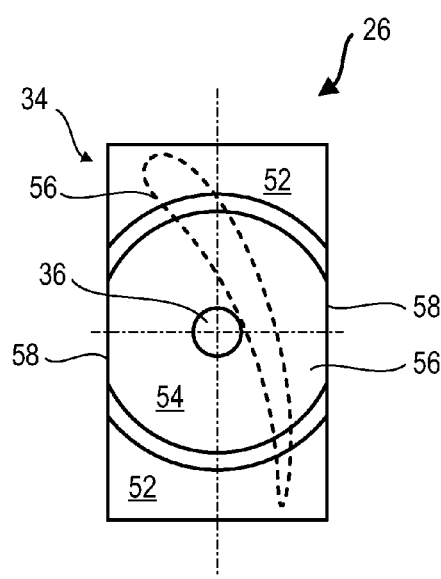
FIG. 5 shows a housing with an annular row of vanes, the platforms of which are in lateral contact with one another, the row being seen radially outwards according to various embodiments of the invention.

FIG. 5 shows a vane platform model from the outside. The blade 50 of the vane which is on the other side of the platform 34 is shown using a dotted line. The platform models can change from one row of vanes to another.

The platform 34 can have an overall quadrilateral shape, such as a rectangle, a trapezoid or a parallelogram. The contour of the platform 34 includes two opposing lateral edges 58, which can be in contact with the neighbouring lateral edges 58 of other vanes of a given row. The lateral edges 58 can be bent or bowed to limit the rotation of same when the attachments of same are tightened. The platform 34 can have an inverted "Z" shape.

The platform 34 is made of metal, e.g., titanium. The platform 34 can also be made of an organic-matrix composite. The platform 34 can be integral with the body of the vane 26. To ensure a precise shape, the contour of same is machined, and potentially ground in order to observe strict tolerances.

The thicker zone 54 can be disk-shaped, the fitting bolt 36 potentially being placed at the centre of the disk and/or of the rectangle. The disk can be truncated laterally, for example on two sides.

Figure 6:
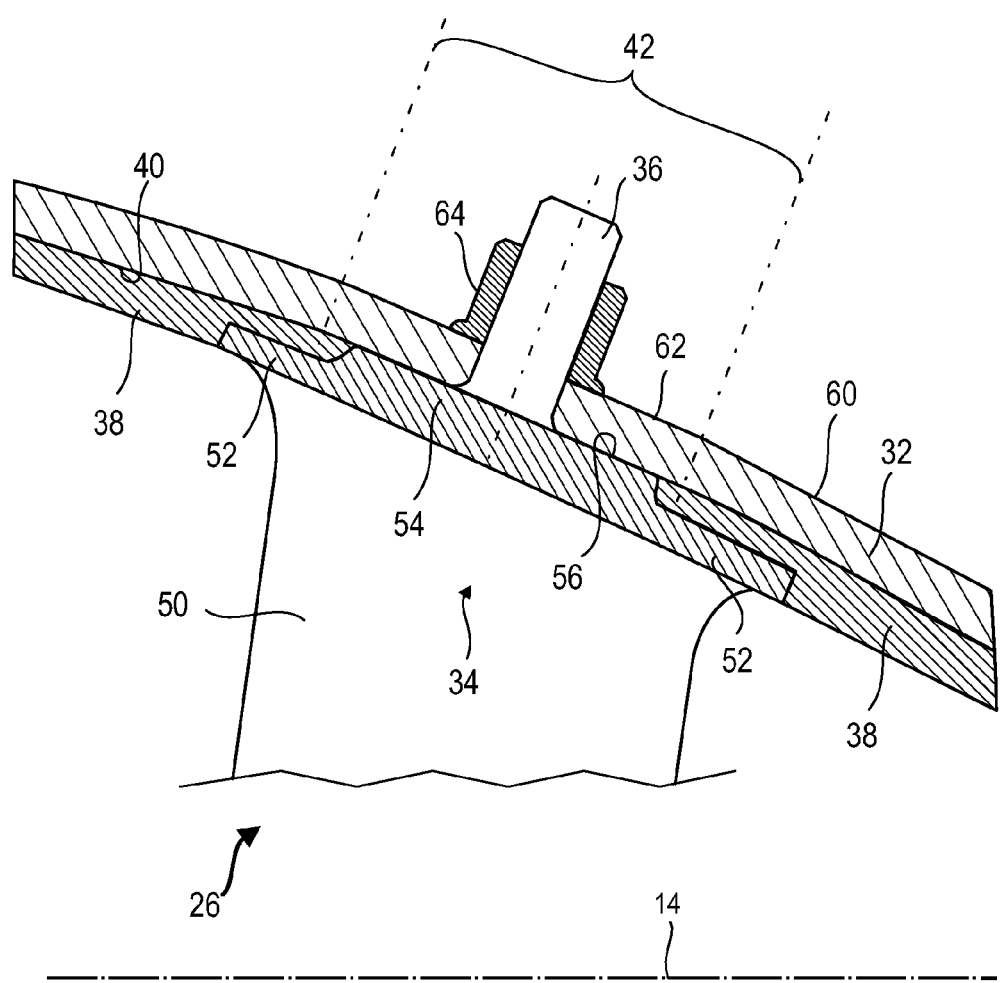
FIG. 6 shows a housing wall portion onto which a vane according to various embodiments of the invention is attached.

FIG. 6 shows a stator vane 26 attached to the wall 32.

The wall 32 can have a generally constant thickness, for example level with at least one or each facet 42. The external surface 60 of same can be curved level with each facet 42, e.g., with a curve that is continuous and/or circumferentially and/or axially even where it passes each facet 42. Alternatively, the external surface 60 of the wall 42 can include a flat 62 beside at least one facet 42, e.g., beside each facet. One or each flat 62 can be parallel to the related facet. A flat 62 forms a flat surface, which can be smooth. A flat 62 can form a discontinuity of the curve of the external surface 60. The flat provides a flat surface for clamping means 64 of the fitting bolt 36.

The or each platform 34 can be in contact with the internal surface 40 of the wall 32 exclusively at the bearing surface 56 of same, on the thicker zone 54. The or each thinner zone can be physically separated from the wall. The abradable material 38 can be inserted between the thinner zones and the wall, and the abradable material 38 can stop at the edges of the or of each thicker zone.

The or each facet 42 forms a discontinuity in the internal surface 40. The contour of at least one or of each facet 42 can form a break line in the curve of the internal surface. Around each facet 42, the tangents of the internal surface can be inclined in relation to the facet 42. The facets 42 can form flat portions on the internal surface 40, the flat portions being inward facing. The wall has material continuity between the facets and the internal surface, and potentially geometric discontinuity.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A housing of an axial turbomachine, said housing comprising:
   a circular wall with an internal surface and an external surface, each surface having a continuous curve around the circumference of the wall, wherein the wall comprises a row of flat facets that are designed to receive platforms of stator vanes, the facets being flush with the internal curved surface of the wall, and the wall comprises an integrally formed and constant thickness portion forming the facets which are flush with the internal curved surface of the wall; and
   an annular fixation flange extending radially, wherein the fixation flange includes a circular row of fixation portions, and is parallel to the row of flat facets of the wall.

2. The housing of claim 1, wherein the external surface of the wall includes at least one row of external flats, each external flat is associated to one facet and overlaps the associated facet.

3. The housing of claim 2, wherein the wall has a constant thickness between each external flat and the respective associated facet, and has a constant thickness from one external flat to the next external flat of the row of external flats.

4. The housing of claim 1, wherein the wall has a constant thickness beside the facets.

5. The housing of claim 1, wherein the facets and the internal surface have an axially continuous surface at the junctions of the facets, the facets being inclined in relation to tangents of the internal curved surface at the junctions of the facets.

6. The housing of claim 1, wherein the housing comprises a plurality of rows of flat facets and two annular flanges extending radially and are parallel to the flat facet rows of the wall, each flat facet row is axially disposed between the annular flanges.

7. The housing of claim 1, wherein the facets and the internal surface have a circumferentially continuous surface at the junctions of same, the facets being inclined in relation to the tangents of the internal curved surface at the junctions of the facets.

8. The housing of claim 1, wherein each facet has at least one attachment hole structured and operable for attaching a stator vane, the holes being arranged in at least one annular row, each hole extending perpendicularly to the respective associated facet.

9. The housing of claim 1, wherein the internal surface extends upstream and downstream from each facet row.

10. The housing of claim 1, wherein the facets of at least one row are disk shaped.

11. The housing of claim 1, wherein the facets of at least one row are one of contiguous individually and along joining lines.

12. The housing of claim 1, wherein the internal surface includes at least a spheroid-surface portion.

13. A compressor of an axial turbomachine, said compressor comprising:

a plurality of annular rows of stator vanes, a housing including a circular wall with an internal surface and an external surface, each surface having a continuous curve around the circumference of the wall, wherein the wall includes a row of flat facets that are flush with the internal curved surface of the wall, the facets comprise holes through the circular wall, each stator vane comprises a fixation portion introduced in the holes for fixedly securing each stator vane to the facets.

14. The compressor of claim 13, wherein at least one fixation portion comprises an attachment platform with a flat bearing surface pressed against a facet.

15. The compressor of claim 14, wherein the platforms of the stator vanes in a given row are in lateral contact with each other, wherein the lateral contact occurs along contact lines extending axially on the majority of the length of the corresponding platform, wherein each stator vane includes a blade extending radially inwards from the platform.

16. The compressor of claim 14, wherein each attachment platform includes at least one thinner zone and one thicker zone, each platform bearing surface contacting a facet formed on a thicker zone and inscribed within a corresponding facet.

17. The compressor of claim 14, wherein at least one stator vane attachment platform includes a fitting bolt that passes through a hole in a related facet and is fixedly secured to the facet hole.

18. A turbojet engine for an aircraft, said turbojet engine comprising:

a row of stator vanes having attachment platforms;

a housing including a circular wall with an internal surface and an external surface, each surface having a continuous curve around the circumference of the wall, wherein the wall includes a row of flat facets that are structured and operable to receive the attachment platforms of stator vanes of the row, the circular wall comprises an integrally formed and constant thickness portion forming the flat facets which are flush with the internal curved surface of the circular wall, and the circular wall includes a composite material with a matrix and a fibrous preform, the preform comprising portions that are parallel to the flat facets.

19. The turbojet engine of claim 18, wherein the fibrous preform comprises a stack of fiber plies, the fiber plies being parallel to the facets beside the facets, and curved beyond the facets.

20. The turbojet engine of claim 18, wherein the housing is a low pressure compressor housing, and wherein the housing is formed by two annular half-housings each having axial flanges for assembling the half-housings.

* * * * *